(12) United States Patent
Wernersson

(10) Patent No.: US 9,883,164 B2
(45) Date of Patent: Jan. 30, 2018

(54) OPTIMIZING USAGE OF IMAGE SENSORS IN A STEREOSCOPIC ENVIRONMENT

(75) Inventor: Mats Wernersson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 727 days.

(21) Appl. No.: 13/274,682

(22) Filed: Oct. 17, 2011

(65) Prior Publication Data
US 2013/0033572 A1    Feb. 7, 2013

Related U.S. Application Data

(60) Provisional application No. 61/514,897, filed on Aug. 3, 2011.

(51) Int. Cl.
*H04N 13/02* (2006.01)
*H04N 13/00* (2006.01)

(52) U.S. Cl.
CPC ..... *H04N 13/0239* (2013.01); *H04N 13/0022* (2013.01); *H04N 13/0296* (2013.01)

(58) Field of Classification Search
CPC ........... H04N 13/0239; H04N 13/0296; H04N 13/0022; H04N 13/02
USPC ..................... 348/46, 335; 382/106; 396/104
See application file for complete search history.

(56) References Cited

U.S. PATENT DOCUMENTS

| | | | |
|---|---|---|---|
| 5,786,847 A | 7/1998 | Katayama et al. | |
| 5,960,219 A * | 9/1999 | Kageyama | G02B 7/32 396/104 |
| 6,122,450 A * | 9/2000 | Nakahara | G02B 7/32 396/123 |
| 2005/0007482 A1* | 1/2005 | Liao | H04N 17/002 348/335 |
| 2008/0273758 A1* | 11/2008 | Fuchs | F16P 3/14 382/106 |

FOREIGN PATENT DOCUMENTS

| | | |
|---|---|---|
| EP | 0641132 A1 | 3/1995 |
| EP | 2083447 A1 | 7/2009 |

OTHER PUBLICATIONS

European Patent Office; Extended European Search Report; May 22, 2013; issued in European Patent Application No. 12174727.3.

* cited by examiner

*Primary Examiner* — Dave Czekaj
*Assistant Examiner* — Berteau Joisil
(74) *Attorney, Agent, or Firm* — James C. Edwards; Moore & Van Allen PLLC

(57) ABSTRACT

The invention is directed to systems, methods and computer program products for optimizing usage of image sensors in a stereoscopic environment. The method includes: (a) providing a first image sensor, where the first image sensor is associated with a first image sensor area and a first imaging area; (b) determining a distance from the camera to an object to be captured; and (c) shifting the first imaging area along a length of the first image sensor area, where the amount of the shifting is based at least partially on the distance from the camera to the object, and where the first imaging area can shift along an entire length of the first image sensor area. The invention optimizes usage of an image sensor by permitting an increase in disparity control. Additionally, the invention reduces the closest permissible distance of an object to be captured using a stereoscopic camera.

17 Claims, 6 Drawing Sheets

OPTIMIZING USAGE OF IMAGE SENSORS IN A STEREOSCOPIC ENVIRONMENT

BACKGROUND

A stereoscopic camera has more than one lens (e.g., two lenses) and more than one image sensor (e.g., two image sensors). Each image sensor is associated with a separate lens. Using multiple image sensor-lens pairs, a stereoscopic camera simulates human binocular vision and enables capture of three-dimensional images. When an object to be captured by the stereoscopic camera is at an infinite distance from the stereoscopic camera, each image sensor of the stereoscopic camera captures an image that is framed at infinity. Since each image is framed at infinity, there is no need to edit the pair of images generated by the image sensor-lens pairs. When an object to be captured by the camera is at a finite distance (e.g., less than or equal ten meters) from the camera, an image sensor-lens pair of the stereoscopic camera captures an image of a framing that is different from the framing of an image captured by another image sensor-lens pair of the stereoscopic camera. Therefore, there is a need to adjust or process the images captured, or to be captured, from each image sensor-lens pair in order to produce images that have the same framing. However, with today's stereoscopic cameras, the amount of adjustment that can be achieved is limited. Therefore, for an object that is situated at a finite distance, there is a need for a stereoscopic camera that permits a greater amount of adjustment so that an image produced by one image sensor-lens pair in a stereoscopic camera has the same framing as an image captured by another image sensor-lens pair of the stereoscopic camera.

BRIEF SUMMARY

Embodiments of the invention are directed to systems, methods and computer program products for optimizing usage of image sensors in a stereoscopic environment. In some embodiments, a method includes: (a) providing a first image sensor that includes a first plurality of pixels, where the first image sensor is associated with a first image sensor area and a first imaging area; (b) determining a distance from the camera to an object to be captured by the camera; and (c) shifting the first imaging area along a length of the first image sensor area, where the amount of the shifting is based at least partially on the distance from the camera to the object, and where the first imaging area can shift along an entire length of the first image sensor area. By enabling the first imaging area to shift along the entire length of the first image sensor area, the invention optimizes usage of an image sensor by permitting an increase in disparity control. Additionally, the invention reduces the closest permissible distance of an object to be captured using a stereoscopic camera.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
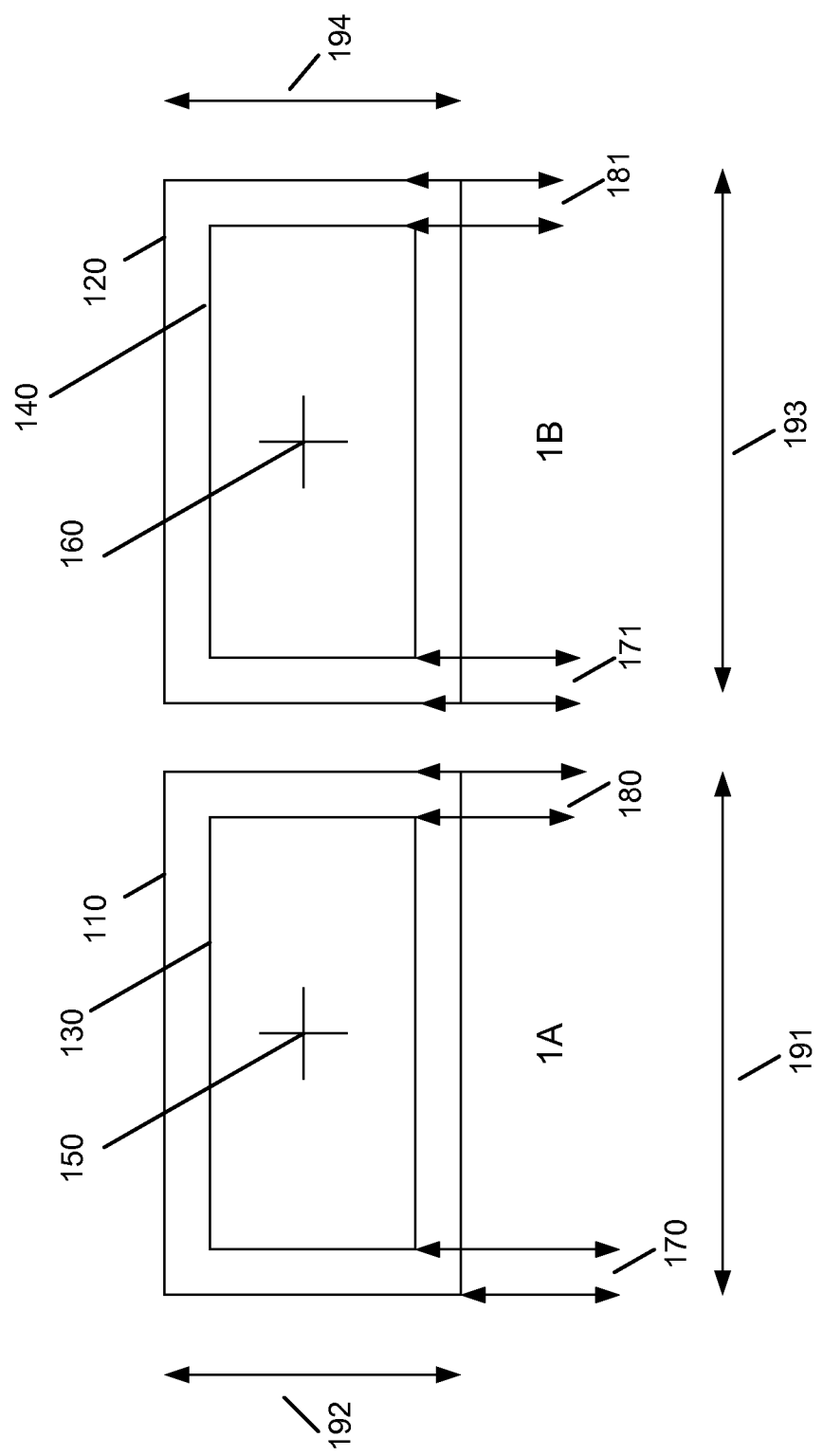
Figure 2:
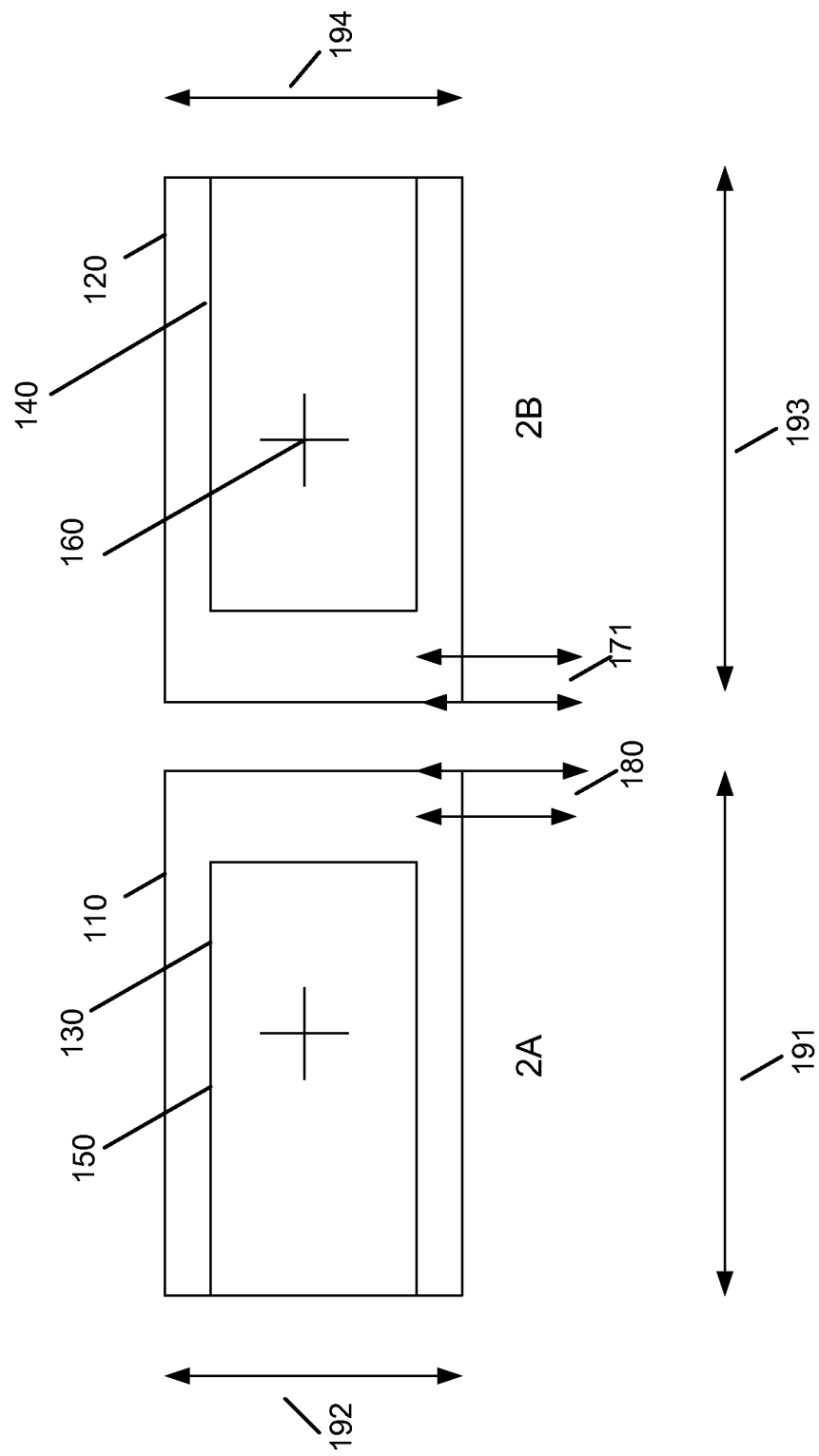
Figure 3:
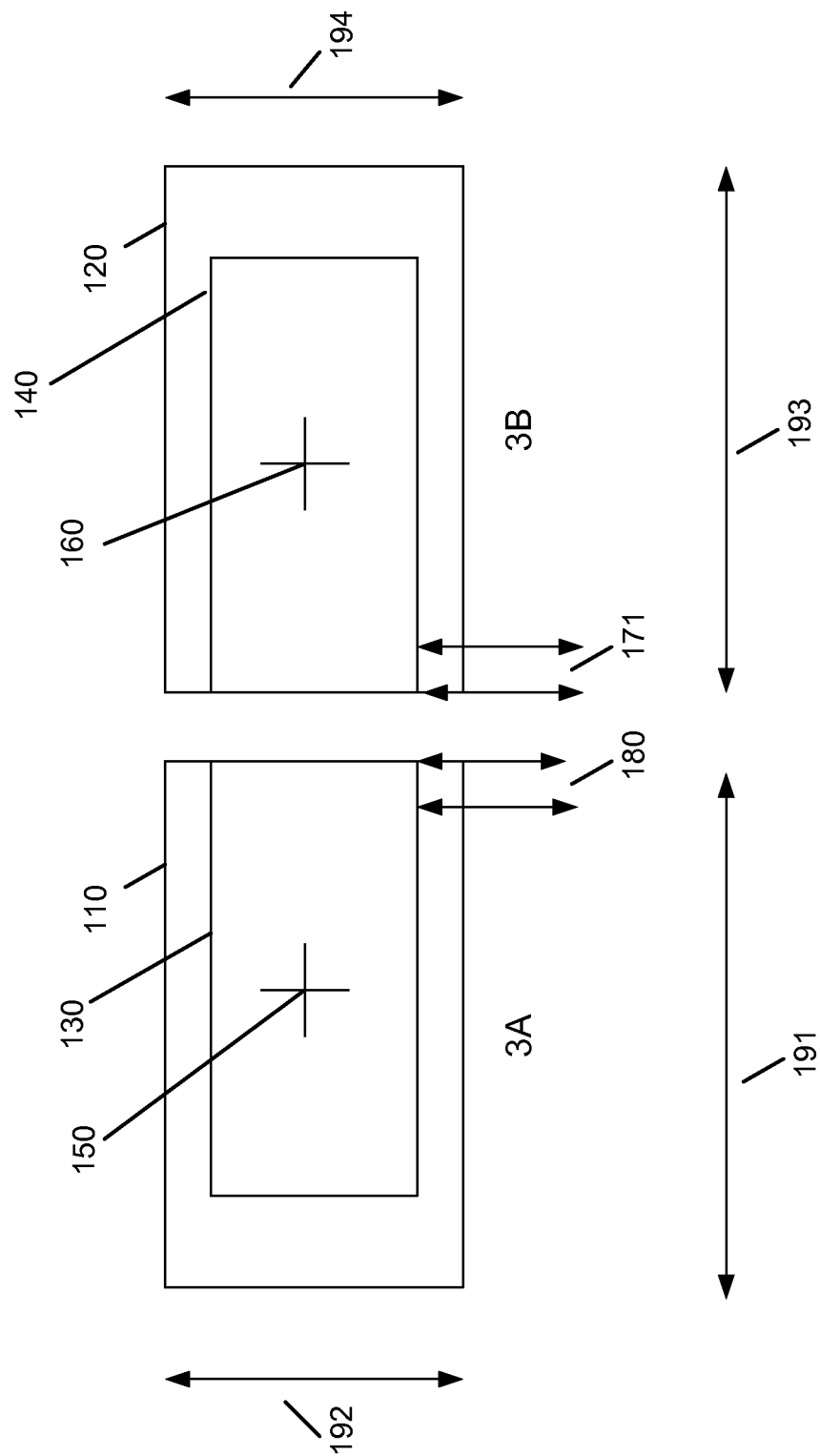
Figure 4:
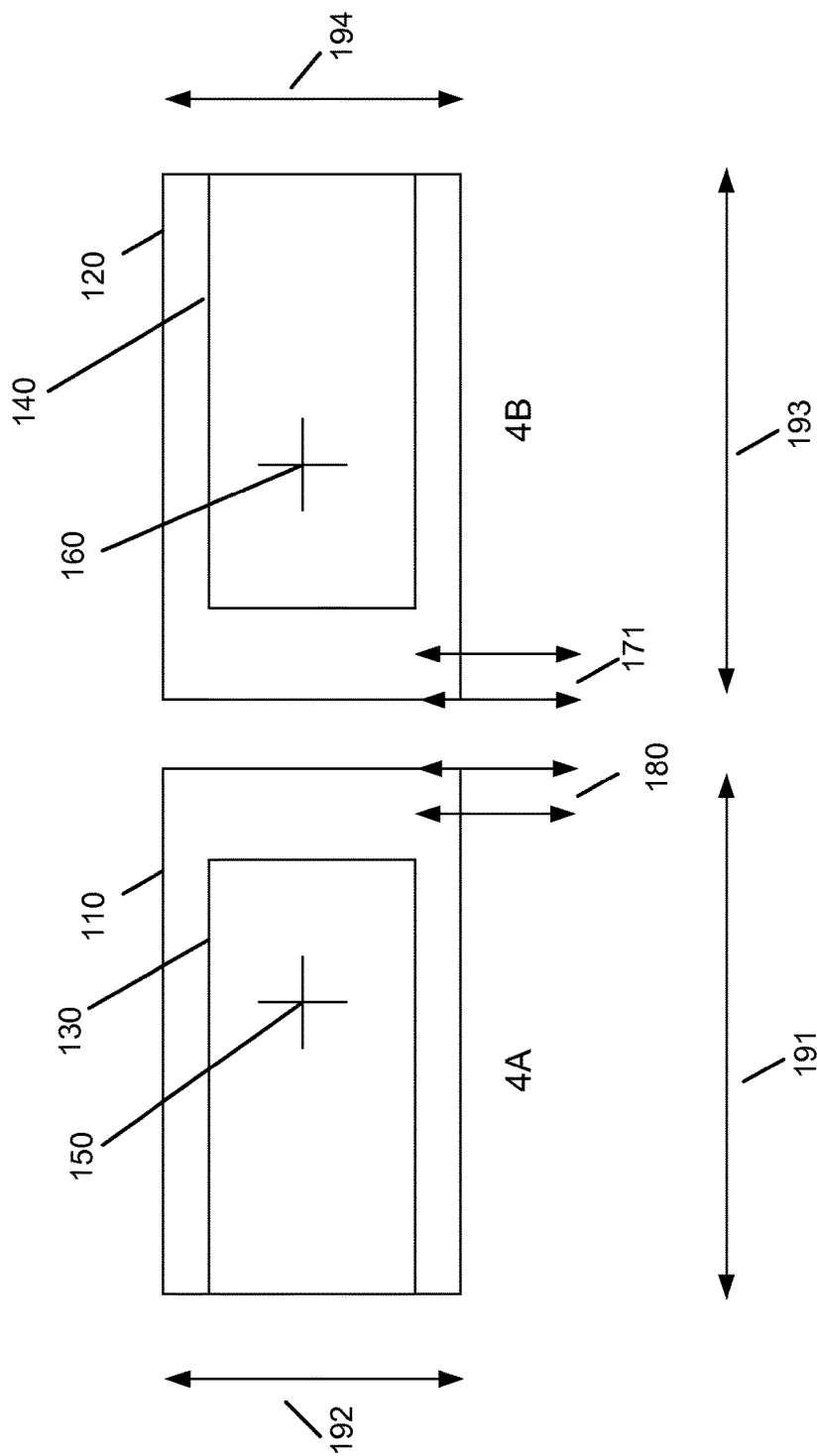
Figure 5:
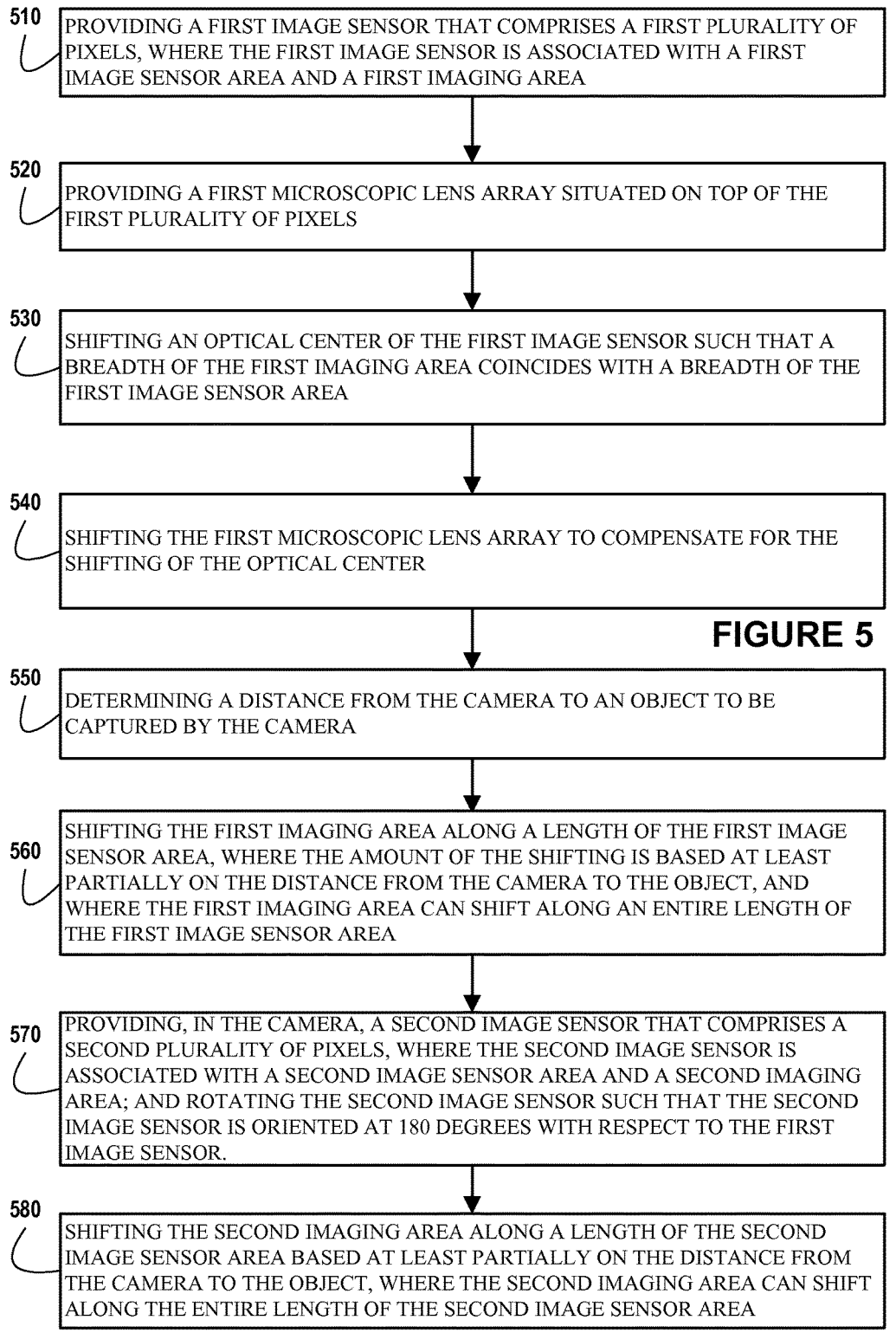
Figure 6:
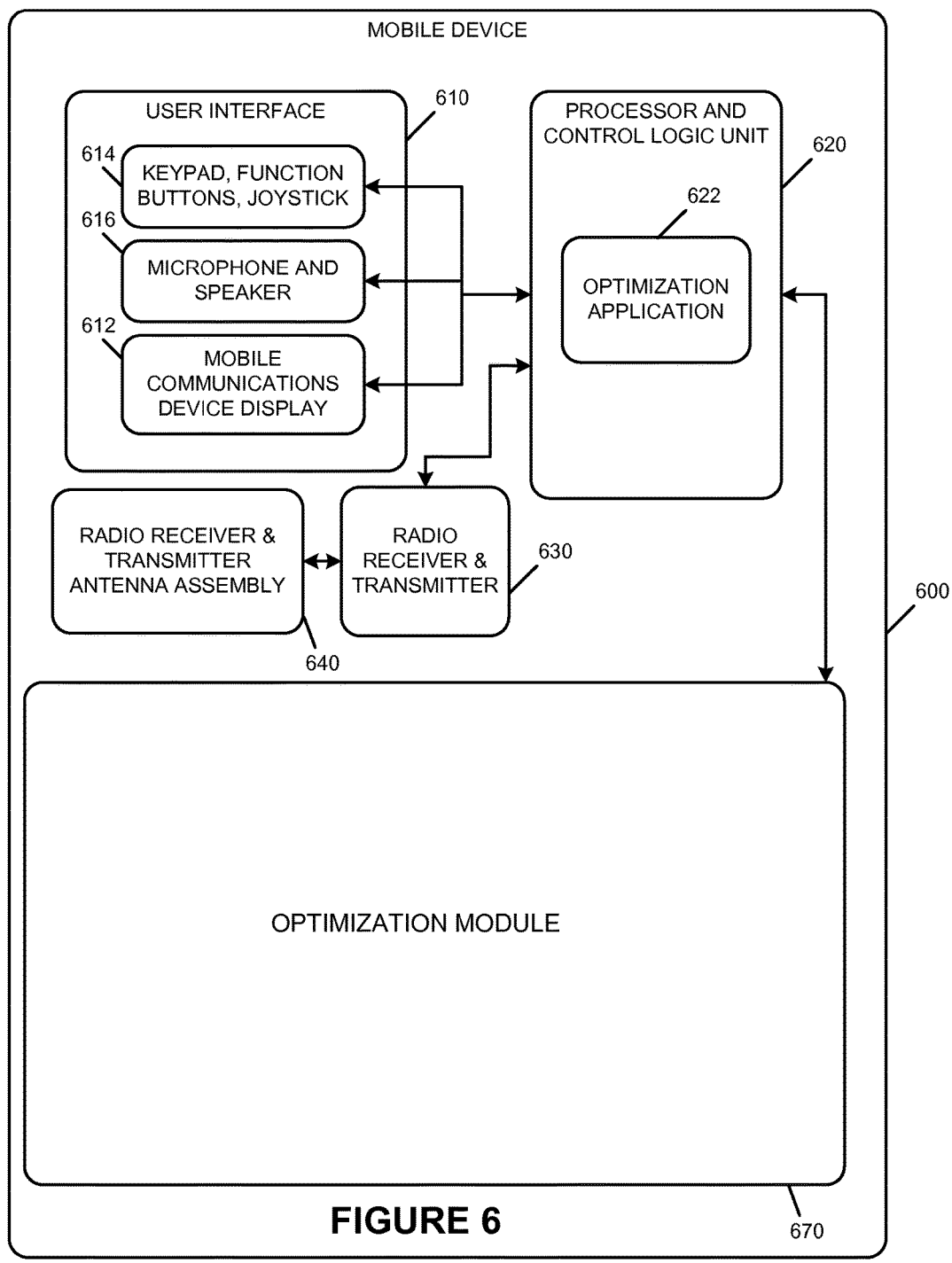

Having thus described embodiments of the invention in general terms, reference will now be made to the accompanying drawings, where:

FIG. 1 illustrates an arrangement to capture images by the first and second image sensors of a stereoscopic camera when the object is at an infinite distance from the stereoscopic camera, in accordance with embodiments of the present invention;

FIG. 2 illustrates an arrangement to capture images by the first and second image sensors of a stereoscopic camera when the object is at a finite distance from the stereoscopic camera, in accordance with embodiments of the present invention;

FIG. 3 illustrates an arrangement to capture images by the first and second image sensors of a stereoscopic camera when the object is at an infinite distance from the stereoscopic camera, in accordance with embodiments of the present invention;

FIG. 4 illustrates an arrangement to capture images by the first and second image sensors of a stereoscopic camera when the object is at a finite distance from the stereoscopic camera, in accordance with embodiments of the present invention;

FIG. 5 is a flowchart illustrating a general process flow for optimizing usage of image sensors in a stereoscopic environment, in accordance with embodiments of the present invention; and FIG. 6 is a block diagram illustrating components of a mobile device that houses hardware and/or software for optimizing usage of image sensors in a stereoscopic environment, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for optimizing usage of image sensors in a stereoscopic environment. For example, a method includes (a) providing a first image sensor that includes a first plurality of pixels, where the first image sensor is associated with a first image sensor area and a first imaging area; (b) determining a distance from the camera to an object to be captured by the camera; and (c) shifting the first imaging area along a length of the first image sensor area, where the amount of the shifting is based at least partially on the distance from the camera to the object, and where the first imaging area can shift along an entire length of the first image sensor area. By enabling the first imaging area to shift along the entire length of the first image sensor area, the invention optimizes usage of an image sensor by permitting an increase in disparity control. Additionally, the invention reduces the closest permissible distance of an object to be captured using a stereoscopic camera.

As used herein, an image sensor is a device that captures light and converts the light into an electronic signal. Each image sensor is made up of individual optical components known as pixels. As an example, an image sensor with an aspect ratio of 4:3 may be used. In such an embodiment, the image sensor area is rectangular and the length of the image sensor area is greater than the width of the image sensor area. In other embodiments, the image sensor area may be of a different shape (e.g., circular, hexagonal, etc.). As used herein, an optical axis is an imaginary line that defines the path along which light propagates through a system. As used herein, an optical center of a lens is a point where light passes straight through the lens and is not deviated by the lens.

Referring now to FIG. 1, FIG. 1A displays a first image sensor area 110 and a first imaging area 130 associated with the first image sensor, and FIG. 1B displays a second image sensor area 120 and a second imaging area 140 associated with the second image sensor. The image sensor area 110, 120 is the area of the image sensor on which light is incident. In some embodiments, the imaging area 130, 140 is a sub-set of the image sensor area 110, 120 and is the area in which the image of the captured object is displayed. In other embodiments, the imaging area 130, 140 may be as large as the image sensor area 110, 120, i.e., the imaging area 130, 140 overlaps with the image sensor area 110, 120. The arrangement presented in FIGS. 1A and 1B is a symmetrical arrangement. This is because the optical center 150, 160 is situated at the center of the image sensor area 110, 120 and at the center of the imaging area 130, 140.

As can be seen in FIG. 1, the dimensions of the image sensor area 110, 120 are greater than the dimensions of the imaging area 130, 140. An image sensor area 110, 120 that is larger than the imaging area 130, 140 allows adjustment or movement of the imaging area 130, 140 within the image sensor area 110, 120. In some embodiments, this adjustment may be referred to as disparity control. In embodiments of the invention, this disparity control can be accomplished either automatically by the stereoscopic camera or manually by a user of the stereoscopic camera (e.g., by using digital or physical arrow buttons on a user interface to adjust the location on the imaging area 130, 140 on a display associated with the stereoscopic camera). In some embodiments of the invention, disparity control can be accomplished along the length 191, 193 of the image sensor area 110, 120 and cannot be accomplished along the width 192, 194 of the image sensor area 110, 120. In other embodiments of the invention, disparity control can be accomplished along the width 192, 194 of the image sensor area 110, 120 and cannot be accomplished along the length 191, 193 of the image sensor area 110, 120. In still other embodiments of the invention, disparity control can be accomplished both along the length 191, 193 and width 192, 194 of the image sensor area 110, 120. As illustrated in FIG. 1, the optical center 150, 160 (for either image sensor-lens pair) lies at the center of the imaging area 130, 140 and at the center of the image sensor area 110, 120. As illustrated in FIG. 1, the two image sensor-lens pairs capture images of the same framing when the object to be captured is at an infinite distance from the stereoscopic camera. In some embodiments, an object is determined to be at an infinite distance if the object is situated at a distance greater than a threshold distance. This threshold may be defined by the user of the stereoscopic camera or may be automatically predetermined by the stereoscopic camera. In other embodiments, an object is determined to be at an infinite distance if the line-of-sight from the first image sensor-lens pair to the object is parallel, or substantially parallel, to the line-of-sight from the second image sensor-lens pair to the object.

Referring now to FIG. 2, as the object to be captured is brought closer to the stereoscopic camera, the first image sensor-lens pair and the second image sensor-lens pair rotate inwards towards each other in order for both image sensor-lens pairs to continue to focus on the object. This happens because the position of the stereoscopic camera remains fixed with respect to the object. The first image sensor-lens pair captures a first image using the arrangement illustrated in FIG. 2A, and the second image sensor-lens pair captures a second image using the arrangement illustrated in FIG. 2B. However, the framing of the second image may be different from the framing of the first image. Parallax causes the framing of the first image to be different from the framing of the second image. Parallax is the apparent displacement in the apparent position of an object viewed along two different lines of sight. In the embodiment described with respect to FIG. 2, the line-of-sight associated with the first image sensor-lens pair is different from the line-of-sight associated with the second image sensor-lens pair. In order for the stereoscopic camera to produce a three-dimensional image, it is essential that the framing of the first image produced by the first image sensor-lens pair matches the framing of the second image produced by the second image sensor-lens pair. This means that the background or foreground (e.g., non-moving background or foreground) should be similarly framed in both images. Additionally, the images must be of the same size and orientation.

In order to compensate for the parallax that occurs when the object moves closer to the stereoscopic camera (and in order for the framing of the first image to match the framing of the second image), the stereoscopic camera crops portions of both the first and second images. For example, the stereoscopic camera crops a left-hand portion of the imaging area 130 in FIG. 2A and a right-hand portion of the imaging area 140 in FIG. 2B. In some embodiments of the invention, the process of cropping occurs prior to the capturing of the image by the stereoscopic camera, while in other embodiments of the invention, the process of cropping occurs after capturing of the image by the stereoscopic camera. FIG. 2 illustrates an embodiment where the object is situated at the closest possible object distance to the stereoscopic camera such that maximum disparity control has been applied. If the object moves any closer to the stereoscopic camera, the imaging area 130, 140 will be cropped even further. Therefore, if the object moves closer to the stereoscopic camera than the closest possible object distance to the stereoscopic camera, the stereoscopic camera crops a larger percentage of the left-hand portion of the imaging area 130, 140 than that displayed in FIG. 2A and a larger percentage of the right-hand portion of the imaging area 130, 140 than that displayed in FIG. 2B. Further, as illustrated in FIG. 2, the inner side margins 180, 171 along the lengths 191, 193 of both the first and second image sensor areas 110, 120 are not used for disparity control.

In embodiments of the invention, a stereoscopic camera has the ability to capture three-dimensional images. The first step is to determine the distance of the object to be captured to the stereoscopic camera (e.g., two (2) meters). The next step is to perform disparity control such that the framing of the images produced by both image sensor-lens pairs is at a distance of two meters. Therefore, with respect to FIG. 3A, the imaging area 130 is moved along the length 191 of the image sensor area 110 (from right to left) such that the framing of the image produced by the first image sensor-lens pair is at a distance of two (2) meters. Similarly, with respect to FIG. 3B, the imaging area 140 is moved along the length 193 of the image sensor area 120 (from left to right) such that the framing of the image produced by the second image sensor-lens pair is at a distance of two (2) meters. When viewing the captured scene on a 3D viewer (e.g., a 3D television screen), the resultant effect is that all objects in the captured scene that are at a distance of two (2) meters will appear at the same distance as the distance of the 3D viewer from the person viewing the 3D viewer. Any object in the captured scene that is at a distance of less than two (2) meters to the stereoscopic camera that captured the scene will appear to come out of the 3D viewer. Any object in the captured scene that is at a distance of greater than two (2) meters to the stereoscopic camera that captured the scene will appear deeper in the 3D viewer. Therefore, disparity control allows movement of a three-dimensional scene backwards and forwards. The present invention provides greater disparity control, and consequently allows increased movement of three-dimensional scene backwards and forwards.

Referring now to FIG. 3, embodiments of the invention include an asymmetric arrangement of image sensors and optics. As illustrated in FIG. 3, the optical centers 150, 160 are shifted sideways with respect to the borders of the image sensor areas 110, 120 associated with the first and second image sensors, and therefore the arrangement is asymmetric. For example, the optical center 150 of FIG. 3A associated with the first image sensor is shifted to the right when compared to the location of the optical center in FIG. 1A. As a further example, the optical center 160 of FIG. 3B associated with the second image sensor is shifted to the left when compared to location of the optical center in FIG. 1B. In embodiments where an image sensor is associated with more than one optical center, each optical center may be shifted sideways with respect to the borders of an image sensor area. The optical center 150 associated with the first image sensor-lens pair is situated at the center of the imaging area 130 in FIG. 3A and the optical center 160 associated with the second image sensor-lens pair is situated at the center of the imaging area 140 in FIG. 3B. By shifting the optical center 150, 160 sideways in FIGS. 3A and 3B, it is possible to utilize the full length of the image sensor area 110, 120 for the purpose of disparity control.

An image sensor has a layer of microscopic lenses (microlenses) that are used to direct light rays to individual pixels of the image sensor. In some embodiments, each pixel of the image sensor has a microscopic lens that is situated on top of the pixel. The purpose of the microscopic lens is to direct as much light as possible into the pixel. There is a difference between how light rays are directed to a pixel that is at the center of the imaging area and how light rays are directed to a pixel situated in a corner of the imaging area. At the center of the imaging area, light rays are directed straight into the pixel along the optical axis of the microscopic lens without deviation caused by the microscopic lens. At the corner of the imaging area, light rays are directed at an angle into the pixel, where the deviation is caused by the microscopic lens. In order to compensate for this angle of deviation, the microscopic lens associated with a pixel is shifted so that light is directed straight into the pixel rather than at an angle into the pixel. Therefore, the microscopic lens array, which includes the entire layer of microscopic lenses situated on top of the pixels, is shifted to compensate for an optical center 150, 160 that is offset from the center of the image sensor area 110, 120, as illustrated in FIG. 3. Therefore, for example, in FIG. 3A, the microscopic lens array associated with the first image sensor is shifted to left in order to compensate for the optical center 150 that is shifted to the right when compared to the location of the optical center 150 in FIG. 1A. As a further example, in FIG. 3B, the microscopic lens array associated with the second image sensor is shifted to the right in order to compensate for the optical center 160 that is shifted to the left when compared to the location of the optical center 160 in FIG. 1B. An underlying assumption of being able to produce the arrangement in FIGS. 3A and 3B is that a user needs to be able to choose the read-out direction of an image sensor. In order to produce the arrangement illustrated in FIG. 3B, the second image sensor is rotated one hundred and eighty (180) degrees with respect to the first image sensor. Therefore, this eliminates the need to produce two different image sensors with different microscopic lens geometry or layout. Therefore, in order to generate the arrangement illustrated in FIG. 3, two image sensors with the same microscopic lens geometry are manufactured and one image sensor is rotated one hundred and eighty (180) degrees with respect to the other image sensor.

Therefore, FIG. 3 illustrates an asymmetric arrangement of image sensors and optics that allows capture of an object situated at an infinite distance (e.g., greater than a threshold distance) from the stereoscopic camera. The framing of the images produced by both image sensor-lens pairs is at infinity. The asymmetric arrangement in FIG. 3 allows the same disparity control when compared to the symmetric arrangement in FIG. 1 using only half of the margin of the image sensor length 191, 193 that is used in FIG. 1. This means that the asymmetric arrangement allows the same disparity control when compared to the symmetric arrangement in FIG. 1 using fewer number of pixels. Additionally, the absolute amount of disparity control provided by the asymmetric arrangement in FIG. 3 is greater than the absolute amount of disparity control provided by the symmetric arrangement in FIG. 1. This means that the closest possible object distance (to the stereoscopic camera) can be one-half (or even less) of the closest possible object distance associated with the symmetric arrangement in FIG. 1. In some embodiments, the asymmetric arrangement, when compared to a symmetric arrangement, may also cause less cropping of a captured image of an object situated at a finite distance from the stereoscopic camera.

Referring now to FIG. 4, as the object to be captured is brought closer to the stereoscopic camera, the first image sensor-lens pair and the second image sensor-lens pair rotate inwards towards each other in order for both image sensor-lens pairs to continue to focus on the object. This happens because the position of the stereoscopic camera remains fixed with respect to the object. The first image sensor-lens pair captures a first image using the arrangement illustrated in FIG. 4A, and the second image sensor-lens pair captures a second image using the arrangement illustrated in FIG. 4B. However, the framing of the second image may be different from the framing of the first image. The reasons for the difference in framing between the first and second images have been explained previously with respect to FIG. 2. In order to compensate for the parallax that occurs when the object moves closer to the stereoscopic camera (and in order for the framing of the first image to match the framing of the second image), the stereoscopic camera crops portions of both the first and second images. For example, the stereoscopic camera crops a left-hand portion of the imaging area 130 in FIG. 4A and a right-hand portion of the imaging area 140 in FIG. 4B.

As illustrated in FIG. 4, and unlike in FIG. 2, the imaging area 130, 140 can be adjusted to move along the entire length of the image sensor area 110, 120 in order to achieve disparity control. Unlike the arrangement in FIG. 2, the arrangement presented in FIG. 4 permits the inner side margins 180, 171 along the lengths of both the first 110 and second 120 image sensor areas to be used for the purpose of disparity control. For example, in FIG. 4A, the imaging area 130 moves from right to left as the object to be captured is brought closer to the stereoscopic camera. As a further example, in FIG. 4B, the imaging area 140 moves from left to right as the object to be captured is brought closer to the stereoscopic camera. The arrangement illustrated in FIG. 4 is for the closest possible object distance to the stereoscopic camera. This closest possible object distance is much smaller than the closest possible object distance permitted by the arrangement in FIG. 2. Therefore, the present invention allows a stereoscopic camera to capture objects at close range because of the asymmetric arrangement of image sensors and optics.

Referring now to FIG. 5, a process flow is provided for optimizing usage of image sensors in a stereoscopic environment. For example, the method 500 presented in FIG. 5 includes the following steps: (a) providing a first image sensor that includes a first plurality of pixels, where the first image sensor is associated with a first image sensor area and a first imaging area 510; (b) providing a first microscopic lens array situated on top of the first plurality of pixels 520; (c) shifting an optical center of the first image sensor such that a width of the first imaging area coincides with a width of the first image sensor area 530; and (d) shifting the first microscopic lens array to compensate for the shifting of the optical center 540. Additionally, the method includes (e) determining a distance from the camera to an object to be captured by the camera 550; and (f) shifting the first imaging area along a length of the first image sensor area, where the amount of the shifting is based at least partially on the distance from the camera to the object 560, and where the first imaging area can shift along an entire length of the first image sensor area. In some embodiments, the amount of the shifting of the first imaging area is based at least partially on both the distance from the camera to the object to be captured and determining the distance from the camera to the object is smaller than a predetermined threshold (e.g., the object is not at infinity). Additionally, the method includes providing, in the camera, a second image sensor that includes a second plurality of pixels, where the second image sensor is associated with a second image sensor area and a second imaging area; and rotating the second image sensor such that the second image sensor is oriented at one hundred and eighty (180) degrees with respect to the first image sensor 570. Still additionally, the method includes shifting the second imaging area along a length of the second image sensor area based at least partially on the distance from the camera to the object 580, where the second imaging area can shift along the entire length of the second image sensor area in a direction opposite to the shifting of the first imaging area along the length of the first image sensor area. In some embodiments, each step presented in FIG. 5 may serve as a triggering event for the next step. However, the steps of the method presented in FIG. 5 may be performed in an order different from that presented in FIG. 5. For example, step 570 of FIG. 5 may be performed immediately after or simultaneously with step 510. As another example, step 580 of FIG. 5 may be performed immediately after or simultaneously with step 560.

In some embodiments, rather than calculating a single distance from the object to the camera, each image sensor-lens pair calculates the distance from the object to the image sensor-lens pair. Subsequently, each image sensor-lens pair performs disparity control (e.g., shifting of the imaging area along a length of the image sensor area) based at least partially on the distance from the object to the image sensor-lens pair. Therefore, the amount of disparity control performed by the first image sensor-lens pair may be different from the amount of disparity control performed by the second image sensor-lens pair.

Embodiments of the invention also provide an apparatus for optimizing usage of image sensors in a stereoscopic environment. The apparatus includes a computing platform including at least one processor and a memory. The apparatus also includes a module, or more than one module, stored in the memory, executable by the processor, and configured to execute the various embodiments of the method described above. Embodiments of the invention also provide a computer program product for optimizing usage of image sensors in a stereoscopic environment. The computer program product includes a non-transitory computer-readable medium including a set of codes for causing a computer to execute the various embodiments of the method described above. For example, the set of codes may cause a computer to configure a position of a first image sensor area associated with a first image sensor, configure a position of a first imaging area associated with the first image sensor, configure (or rotate) a second image sensor such that the second image sensor is oriented at one hundred and eight (180) degrees with respect to the first image sensor, configure a position of a second image sensor area associated with a second image sensor, and configure a position of a second imaging area associated with the second image sensor.

Referring now to FIG. 6, a block diagram is presented for a mobile device 600 that houses a module 670 for optimizing usage of an image sensor of a camera, in accordance with embodiments of the present invention. The mobile device 600 may be a cordless telephone, cellular telephone, personal digital assistant (PDA), communicator, computer device or the like and is not unique to any particular communications standard, such as Advanced Mobile Phone Service (AMPS), Digital Advanced Mobile Phone Service (D-AMPS), Global System for Mobile Communications (GSM), Code Division Multiple Access (CDMA) or the like. In some embodiments, the mobile device 600 may not have communication capability and may only include the capability to capture images (e.g., a camera such as a stereoscopic camera). The design of mobile device 600 illustrated in FIG. 6 is for purposes of explaining the present invention and the present invention is not limited to any particular design.

The mobile device 600 shown in FIG. 6 may include an operator or user interface 610 to facilitate controlling operation of the mobile device including initiating and conducting phone calls and other communications. The user interface may include a display 612 to provide visual signals to a subscriber or user as to the status and operation of the mobile device 600. The display 612 may be a liquid crystal display (LCD) or the like capable of presenting color images. The display 612 may provide information to a user or operator in the form of images, text, numerals, characters, a graphical user interface (GUI) and the like.

The user interface 610 may also include a keypad and function keys or buttons 614 including a pointing device, such as a joystick or the like. The keypad, function buttons and joystick 614 permit the user to communicate commands to the mobile device 600 to dial phone numbers, initiate and terminate calls, establish other communications, such as access to a mobile television provider, the Internet, send and receive email, text messages and the like. The keypad, function buttons and joystick 614 may also be used to control other operations of the mobile device 600. The keypad, function buttons and joystick 614 may also be implemented on a touch sensitive display adapted to receive tactile input.

The display 612, keypad, and function buttons 614 may be coupled to a main processor and control logic unit 620. The processor and control logic unit 620 may be a microprocessor or the like. The processor and logic unit 620 may include a feature to enable redirecting broadcast signals to an alternate destination. The functions and operations described with respect to the method of FIG. 5 (and the embodiments described in FIGS. 1-4) may be embodied in an optimization application 622. In some embodiments, the optimization application 622 may automatically perform the functions of shifting an optical center of the first image sensor such that a width of the first imaging area coincides (or overlaps) with a width of the first image sensor area, and shifting the first microscopic lens array to compensate for the shifting of the optical center. Additionally, in some embodiments, the optimization application 622 may perform the function of determining a distance from the camera to an object to be captured by the camera, and shifting the first imaging area along a length of the first image sensor area, where the amount of the shifting is based at least partially on the distance from the camera to the object, and where the first imaging area can shift along an entire length of the first image sensor area. In some embodiments, the amount of the shifting of the imaging area is based at least partially on both the distance from the camera to the object to be captured and determining the distance from the camera to the object is smaller than a predetermined threshold. In some embodiments, the optimization application 622 may automatically define the predetermined threshold, while in other embodiments, the optimization application may prompt a user to select or define the predetermined threshold via the user interface 610. If an object is determined to be situated at a distance greater than the predetermined threshold, the settings of both image sensor-lens pairs are such that the object is at infinity. This results in captured images that are framed at infinity. Still additionally, in some embodiments, the optimization application 622 may perform the functions of rotating the second image sensor such that the second image sensor is rotated 180 degrees with respect to the first image sensor, and shifting the second imaging area based at least partially on the distance from the camera to the object, where the second imaging area can shift along an entire length of the second image sensor area in a direction opposite to the shifting of the first imaging area along the length of the first image sensor area. Still additionally, in some embodiments, the optimization application 622 may allow a user to select, via the user interface 610, an option (e.g., a digital button, icon, etc.) to switch between the symmetric arrangement presented in FIG. 1 and the asymmetric arrangement presented in FIG. 3. Therefore, for example, when the user selects an option to switch from a symmetric arrangement to an asymmetric arrangement, the optimization application 622 causes, for both image sensor-lens pairs, the optical center of the image sensor area to shift sideways and causes a microscopic lens array to shift in a direction opposite to the shifting of the optical center in order to compensate for the shifting of the optical center.

The optimization application 622 may be embodied in hardware, firmware, software (data structures) or combinations thereof. The processor and logic unit 620 may also include other data structures, software programs, computer applications and the like to encode and decode control signals; perform communication procedures and other functions as described herein. In some embodiments, the functions of the application 622 may be executed by the user via the user interface 610. For example, the user interface 610 may prompt a user to define or to select from a plurality of amounts, the amount of shifting of the first imaging area (or second imaging area) along a length of a first image sensor area (or second image sensor area). As a further example, the user interface 610 may allow the user to enter input that causes the first imaging area to shift along the length of the first image sensor area, but does not cause the second imaging area to shift along the length of the second image sensor area. In other embodiments, the functions of the application 622 may be automatically executed by the processor and the logic unit 620 upon the occurrence of one or more triggering events.

The user interface 610 may also include a microphone and a speaker 616. The microphone 616 may receive audio or acoustic signals from a user or from another acoustic source. The microphone 616 may convert the audio or acoustic signals to electrical signals. The microphone 616 may be connected to the processor and logic unit 620 where the processor and logic unit 620 may convert the electrical signals to baseband communication signals. The processor and control logic unit 620 may be connected to a radio transmitter and receiver 630 that may convert baseband signals from the processor and control logic unit 620 to radio frequency (RF) signals. The mobile radio transmitter and receiver 630 may be connected to an antenna assembly 640 for transmission of the RF signals to a communication medium or system, such as a mobile access network (voice/data) or the like.

The antenna assembly 640 may receive RF signals over the air and transfer the RF signals to mobile radio transmitter and receiver 630. The mobile radio transmitter and receiver 630 may convert the RF signals to baseband signals. The baseband signals may be applied to the processor and control logic unit 620 which may convert the baseband signals to electrical signals. The processor and control unit 620 may send the electrical signals to the speaker 616 which may convert the electrical signals to audio signals that can be understood by the user.

The block diagram of the mobile device 600 also illustrates an optimization module 670. The optimization module 670, which includes a combination of hardware and software, performs the various processes associated with the optimization application 622.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for optimizing usage of an image sensor of a camera, the method comprising:
   providing a first image sensor that comprises a first plurality of pixels, wherein the first image sensor further comprises a first image sensor area on which light is incident and is associated with a first imaging area in which an image of an object to be captured by the camera is displayed, wherein the first imaging area is partially overlapping with the first image sensor area such that a length of the first image sensor area is greater than a length of the first imaging area;
   determining a distance from the camera to an object to be captured by the camera;
   determining the distance from the camera to the object is less than a predetermined threshold; and
   in response to determining the distance from the camera to the object is less than the predetermined threshold, shifting the first imaging area lengthwise from a first border of the first image sensor area up to a second border of the first image sensor area, wherein the amount of the shifting is based at least partially on the distance from the camera to the object, wherein the first imaging area can shift along the entire length of the first image sensor area.

2. The method of claim 1, wherein the length of the first image sensor area is greater than a length of the first imaging area.

3. The method of claim 1, further comprising:
providing a first microscopic lens array situated on top of the first plurality of pixels;
shifting an optical center of the first image sensor such that a width of the first imaging area coincides with a width of the first image sensor area; and
shifting the first microscopic lens array to compensate for the shifting of the optical center.

4. The method of claim 1, wherein the position of the optical center does not change when the first imaging area is moved along the length of the first image sensor area.

5. The method of claim 1, further comprising:
providing, in the camera, a second image sensor that comprises a second plurality of pixels, wherein the second image sensor is associated with a second image sensor area and a second imaging area; and
rotating the second image sensor such that the second image sensor is oriented at 180 degrees with respect to the first image sensor.

6. The method of claim 5, further comprising:
shifting the second imaging area along a length of the second image sensor area based at least partially on the distance from the camera to the object, wherein the second imaging area can shift along the entire length of the second image sensor area in a direction opposite to the shifting of the first imaging area along the length of the first image sensor area.

7. An apparatus for optimizing usage of an image sensor of a camera, the apparatus comprising:
a first image sensor that comprises a first plurality of pixels, wherein the first image sensor further comprises a first image sensor area on which light is incident and is associated with a first imaging area in which an image of an object to be captured by the camera is displayed, wherein the first imaging area is partially overlapping with the first image sensor area;
a memory;
a processor; and
a module stored in the memory, executable by the processor, and configured to:
determine a distance from the camera to an object to be captured by the camera;
determine the distance from the camera to the object is less than a predetermined threshold; and
in response to determining the distance from the camera to the object is less than the predetermined threshold, shift the first imaging area lengthwise from a first border of the first image sensor area up to a second border of the first image sensor area, wherein the amount of the shifting is based at least partially on the distance from the camera to the object, wherein the first imaging area can shift along the entire length of the first image sensor area.

8. The apparatus of claim 7, wherein the length of the first image sensor area is greater than a length of the first imaging area.

9. The apparatus of claim 7, further comprising:
a first microscopic lens array situated on top of the first plurality of pixels; and the module further configured to:
shift an optical center of the first image sensor such that a width of the first imaging area coincides with a width of the first image sensor area; and
shift the first microscopic lens array to compensate for the shifting of the optical center.

10. The apparatus of claim 7, wherein the position of the optical center does not change when the first imaging area is moved along the length of the first image sensor area.

11. The apparatus of claim 7, further comprising:
a second image sensor that comprises a second plurality of pixels, wherein the second image sensor is associated with a second image sensor area and a second imaging area, wherein the second image sensor is oriented at 180 degrees with respect to the first image sensor.

12. The apparatus of claim 11, wherein the module is further configured to:
shift the second imaging area along a length of the second image sensor area based at least partially on the distance from the camera to the object, wherein the second imaging area can shift along the entire length of the second image sensor area in a direction opposite to the shifting of the first imaging area along the length of the first image sensor area.

13. A non-transitory computer program product for optimizing usage of an image sensor of a camera, the computer program product comprising:
a non-transitory computer-readable medium comprising a set of codes for causing a computer to:
configure a position of a first image sensor area of a first image sensor and on which light is incident, wherein the first image sensor comprises a plurality of pixels;
configure a position of a first imaging area associated with the first image sensor in which an image of an object to be captured by the camera is displayed, wherein the first imaging area is partially overlapping with the first image sensor area such that a length of the first image sensor area is greater than a length of the first imaging area;
determine a distance from the camera to an object to be captured by the camera;
determine the distance from the camera to the object is less than a predetermined threshold; and
in response to determining the distance from the camera to the object is less than the predetermined threshold, shift the first imaging area lengthwise from a first border of the first image sensor area up to a second border of the first image sensor area, wherein the amount of the shifting is based at least partially on the distance from the camera to the object, wherein the first imaging area can shift along the entire length of the first image sensor area.

14. The non-transitory computer program product of claim 13, wherein the length of the first image sensor area is greater than a length of the first imaging area.

15. The non-transitory computer program product of claim 13, wherein the set of codes further causes a computer to:
shift an optical center of the first image sensor such that a width of the first imaging area coincides with a width of the first image sensor area; and shift the first microscopic lens array to compensate for the shifting of the optical center, wherein the first microscopic lens array situated on top of the first plurality of pixels.

16. The non-transitory computer program product of claim 13, wherein the set of codes does not cause a position of the optical center to change when the first imaging area is moved along the length of the first image sensor area.

17. The non-transitory computer program product of claim 13, wherein the set of codes further causes a computer to:
   configure a position of a second image sensor area associated with a second image sensor, wherein the second image sensor comprises a plurality of pixels and is oriented at 180 degrees with respect to the first image sensor;
   configure a position of a second imaging area associated with the second image sensor; and
   shift the second imaging area along a length of the second image sensor area based at least partially on the distance from the camera to the object, wherein the second imaging area can shift along the entire length of the second image sensor area in a direction opposite to the shifting of the first imaging area along the length of the first image sensor area.

* * * * *